(12) United States Patent
Gyulai et al.

(10) Patent No.: US 11,142,199 B2
(45) Date of Patent: Oct. 12, 2021

(54) METHOD AND APPARATUS FOR CONTROLLING CRUISE CONTROL

(71) Applicant: Robert Bosch GmbH, Stuttgart (DE)

(72) Inventors: Gabor Gyulai, Budapest (HU); Eors Mezey, Urom (HU); Oliver Sandor Bajnoczki, Erd (HU)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 16/593,329

(22) Filed: Oct. 4, 2019

(65) Prior Publication Data
US 2020/0130687 A1 Apr. 30, 2020

(30) Foreign Application Priority Data
Oct. 31, 2018 (EP) .................................... 18203813

(51) Int. Cl.
*B60W 30/14* (2006.01)
*B60W 30/16* (2020.01)
*B60W 50/16* (2020.01)
*B60W 50/14* (2020.01)

(52) U.S. Cl.
CPC ........ *B60W 30/143* (2013.01); *B60W 30/162* (2013.01); *B60W 50/16* (2013.01); *B60W 2050/143* (2013.01); *B60W 2050/146* (2013.01); *B60W 2520/10* (2013.01); *B60W 2540/10* (2013.01); *B60W 2540/12* (2013.01); *B60W 2554/801* (2020.02)

(58) Field of Classification Search
CPC .. B60W 30/143; B60W 30/162; B60W 50/16; B60W 2554/801; B60W 2050/143; B60W 2050/146; B60W 2520/10; B60W 2540/10; B60W 2540/12; B60W 50/14; B60W 2510/0609
See application file for complete search history.

(56) References Cited

U.S. PATENT DOCUMENTS

2017/0151948 A1* 6/2017 Liu ..................... B60W 40/105

FOREIGN PATENT DOCUMENTS

| DE | 10261624 A1 | 7/2004 | |
| DE | 102006012514 | 9/2007 | |
| DE | 102010009480 A1 * | 9/2011 | .......... B60W 30/143 |
| DE | 10261624 B4 * | 4/2014 | ............ B60W 30/16 |
| DE | 102016223433 A1 | 6/2017 | |
| GB | 2529653 A | 3/2016 | |

OTHER PUBLICATIONS

Machine Translation of DE102010009480A1 (Year: 2010).*

* cited by examiner

*Primary Examiner* — Anne Marie Antonucci
*Assistant Examiner* — Andrew J Cromer
(74) *Attorney, Agent, or Firm* — Norton Rose Fulbright US LLP; Gerard Messina

(57) ABSTRACT

Improved control of cruise control for a vehicle, in particular an automated activation of cruise control. For this purpose, the speed of the vehicle is monitored. If the speed of the vehicle and/or a distance between the vehicle and a further vehicle in front of the vehicle is within a predetermined range for a specific period of time it is indicated to a user that cruise control can be activated. Accordingly, cruise control can be automatically activated after providing the indication to the user, or a user may respond to this indication by providing a specific activity such as a release of the acceleration pedal.

20 Claims, 3 Drawing Sheets

METHOD AND APPARATUS FOR CONTROLLING CRUISE CONTROL

CROSS REFERENCE

The present application claims the benefit under 35 U.S.C. § 119 of European Patent Application No. EP 18203813.3 filed on Oct. 31, 2018, which is expressly incorporated herein by reference in its entirety.

FIELD

The present invention relates to a method and an apparatus for controlling cruise control. In particular, the present invention relates to controlling cruise control of a vehicle.

BACKGROUND INFORMATION

Cruise control such as normal cruise control (NCC) or adaptive cruise control (ACC) are implemented in many modern vehicles such as cars or trucks. Usually, the function of ACC/NCC is switched on and off manually by a driver. After activating cruise control, systems of the vehicle automatically control the speed of the vehicle without further activities of the driver.

German Patent Application No. DE 10 2006 012 514 A1 describes a control unit for controlling a drive unit of a vehicle. If a constant driving speed is detected over a predetermined period of time, a constant driving mode is automatically activated as long as a driver provides an input signal for maintaining the speed of the vehicle within a predetermined range of a speed. Upon the user does not provide an input for maintaining the speed, the constant driving mode is automatically deactivated.

SUMMARY

The present invention replates to a method and an apparatus for controlling cruise control of a vehicle. Further embodiments are described herein.

According to a first aspect of the present invention, an example method is provided for controlling a cruise control of a vehicle. The method comprises a step of outputting a signaling when a speed of the vehicle and/or a distance between the vehicle and a further vehicle in front of the vehicle is within a predetermined range for a first period of time. Further, the method comprises activating cruise control of the vehicle after the signaling has been output. Accordingly, the cruise control of the vehicle is activated after it has been detected that a speed of the vehicle within the predetermined range for the first period of time.

According to a further aspect of the present invention, an example apparatus is provided for controlling cruise control of a vehicle. The apparatus comprises a receiving device and a controller. The receiving device is adapted to receive a speed signal corresponding to a speed of the vehicle and/or a distance signal corresponding to a distance between the vehicle and a further vehicle in front of the vehicle. The controller is adapted to output a signaling when a speed of the vehicle and/or a distance between the vehicle and a further vehicle in front of the vehicle is within a predetermined range for a first period of time. The controller is further adapted to activate the cruise control of the vehicle after the signaling has been output. Accordingly, the controller activates the cruise control of the vehicle after it has been determined that the speed of the vehicle is within a predetermined range for the first period of time.

The present invention is based on the fact that a conventional cruise control such as a normal or adaptive cruise control requires a manual user action for activating and/or deactivating of cruise control. However, each user action, in particular each activation or deactivation of cruise control requires attention of the driver.

The present invention aims to take into account this fact and to provide an improved control of cruise control for a vehicle requiring less attention of the driver. In particular, the present invention aims to provide an automatic activation of cruise control or at least an automatic suggestion, when it is appropriate to activate cruise control. In this way, activation or deactivation of cruise control requires less attention of the driver and thus, the attention of the driver can be directed more to traffic situations. In this way, the driver can be relieved of his workload for controlling the advanced driver assistance systems such as cruise control.

After activating cruise control, the user can remove his foot from the acceleration pedal and the speed of the vehicle is controlled by the cruise control system without any further activities of the user.

By monitoring the speed of a vehicle, it is possible to identify driving situations in which an automatic cruise control might be appropriate. For example, as long as the speed of the vehicle changes significantly, it might be not appropriate to control the speed of the vehicle by a cruise control system. However, when the speed of the vehicle is within a specific range for a certain period of time, this might be an indication for an appropriate situation that a cruise control system may automatically control the speed of the vehicle. Thus, it might be possible to take over the control of the speed of a vehicle by an automated system such as a cruise control system.

Accordingly, upon detecting that a speed of the vehicle or a distance between the ego-vehicle and a further vehicle in front of the ego-vehicle is within a predetermined range for a certain period of time, cruise control might be activated automatically or at least an activation of cruise control might be suggested to a user. In particular, a signaling may be provided to the driver of the vehicle. This signaling might indicate that the system can activate cruise control to take over the controlling of the speed of a vehicle. Hence, the user no longer has to perform additional operations for activating cruise control.

By providing a signaling to the user which indicates the possibility for an automated activation of cruise control, the driver still has full control over the driving speed of the vehicle. In particular, the user can perform any kind of appropriate action in order to prevent the automated activation of cruise control. However, if the user wants to accept the automated activation of the cruise control, this can be achieved without complex user activities and thus, the attention of the user still remains on the traffic situation.

In a possible embodiment of the present invention, the method may further comprise a step of detecting a predefined user activity after the signaling has been output. Accordingly, the cruise control of the vehicle may be activated after the predefined user activity has been detected. In this way, the activation of the cruise control is performed in two steps. In a first step, the system automatically identifies a driving situation which might be appropriate for activating a cruise control. If such situation is detected, a signaling is provided to the user. In a second step, the user can decide whether or not he wants to accept this suggestion for automatically activating cruise control. Only if the user accepts this suggestion to activate cruise control, the cruise control is activated. Otherwise, if no appropriate response from the user to the suggestion for activating cruise control is received, no automatic activation of cruise control is performed.

In a possible embodiment of the present invention, the predefined user activity may comprise a release of an accelerator pedal. However, any other appropriate user activity may be also used for indicating that a user might accept the suggestion to automatically activate cruise control. By releasing the acceleration pedal of a vehicle, the user takes his foot off the acceleration pedal, and thus, the foot of the user is at an appropriate position for automated cruise control.

In a possible embodiment of the present invention, the cruise control of the vehicle is only activated if the speed of the vehicle is within the predetermined range when detecting the predefined user activity. Otherwise, if the speed of the vehicle has changed when the user provides the activity for accepting the suggestion of activating cruise control, the decision for activating cruise control is no longer valid, and thus no activation of cruise control is performed.

In a possible embodiment of the present invention, cruise control of the vehicle is only activated if the predefined user activity is detected within a second period of time after outputting the signaling. Accordingly, the time period for accepting the suggestion to automatically activate cruise control is limited. In this way, the signaling may be also provided only for the second period of time. Hence, if the user does not want to accept the suggestion for automated activation of cruise control, the user is not disturbed by continuously providing the respective signaling. The second period of time may be a predetermined fixed period of time or the second period of time may be set variable. For example, the second period of time may be adapted depending of the speed of the vehicle, or another parameter such as a road situation, a steering wheel angle, etc.

In a possible embodiment of the present invention, the signaling may be an optic, acoustic and/or haptic signaling. For example, an optic signaling may be provided by a signaling lamp, highlighting an appropriate symbol on an instrument panel of the vehicle or the like. Furthermore, an acoustic signal may be provided by outputting a sound signal or the like. A haptic signaling may be provided by vibrating a steering wheel of the vehicle or a pedal, in particular the accelerator pedal or the like. However, it is understood that any other kind of signaling may be also provided.

In a possible embodiment of the present invention, the method may comprise a step of deactivating the cruise control of the vehicle upon detecting a further user activity. Accordingly, cruise control may be deactivated at any appropriate point of time based on a user activity. In particular, cruise control can be deactivated even if the conditions for the automated activation of cruise control remain. After deactivating cruise control, the speed of the vehicle may be further monitored in order to identify further conditions for activating cruise control at a later point of time.

In a possible embodiment of the present invention, the further user activity may be an operation of a brake pedal or of the accelerator pedal. However, any other appropriate user input may be also possible. Hence, cruise control can be immediately deactivated upon receiving a user activity which may cause a change of the speed of the vehicle such as an acceleration or a braking operation.

In a possible embodiment of the present invention, the first period of time may be dynamically adapted. In particular, the first period of time may be adapted depending on the speed of the vehicle, a road situation and or a user input. For example, the first period of time may be increased for a higher speed of the vehicle. For example, a number of two or more periods of time may be defined for different ranges of speed of the vehicle. However, any other scheme for adapting the first period of time depending on the speed of the vehicle may be also possible. For instance, it may be possible to consider different periods of time depending on a road situation. For example, in a curvy road situation the first period of time may be increased and a shorter period of time may be applied for straight or almost straight roads. Furthermore, the period of time may be increased if the user does not have accepted the suggestion for automatic activation of cruise control before. For example, the first period of time may be increased if the user has not accepted a predetermined number of suggestions for activating cruise control before. Furthermore, any other kind of parameter may be used for adapting the conditions for suggesting automatic activation of cruise control. For example, a steering wheel angle, a transmission lever/selector or the like may be taken into account, or the vehicle movement or a traffic situation may be monitored and evaluated.

BRIEF DESCRIPTION OF THE DRAWINGS

For a more complete understanding of the present invention and advantages thereof, reference is made to the description below and the figures. The present invention is explained in more detail below using exemplary embodiments which are shown in the schematic figures.

The figures are intended for providing further understanding of the embodiments of the present invention. They illustrate example embodiments and, in conjunction with the description, help to explain principals of the present invention. Other embodiments and many of the advantages mentioned become apparent in view of the figures.

DETAILED DESCRIPTION OF EXAMPLE EMBODIMENTS

Figure 1:
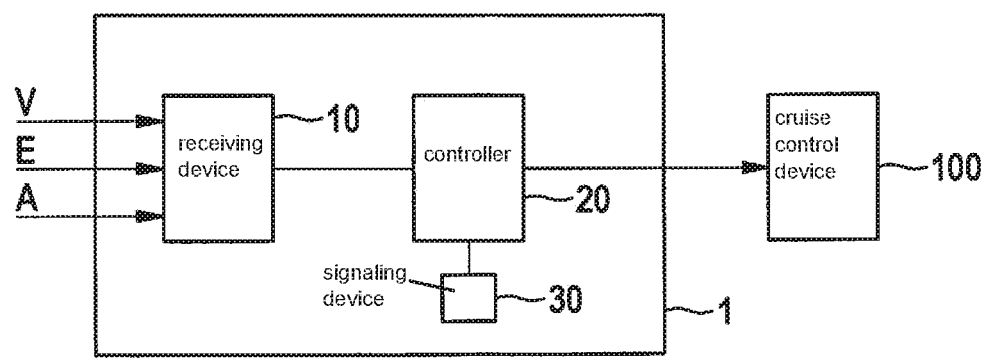
FIG. 1 shows a block diagram of an apparatus for controlling cruise control of a vehicle according to an embodiment.

FIG. 1 shows a block diagram of an apparatus 1 for controlling cruise control, in particular for controlling cruise control of a vehicle. The apparatus 1 may comprise a receiving device 10 and a controller 20. The receiving device 10 may receive a signaling V of a current speed of a vehicle. Additionally, receiving device may receive a signaling V corresponding to a distance between the vehicle and a further vehicle in front of the vehicle For example, the signaling V of the speed may be provided from an external control device, such as a control device of the vehicle. Furthermore, it may be also possible to provide the signaling V of the speed or the distance by means of a speed sensor, a radar sensor or the like. Receiving device 10 may further receive additional signals, such as a signaling E to enable a cruise control function of the vehicle. The cruise control function may be, for example a normal cruise control or an adaptive cruise control. In a normal cruise control mode, the speed of a vehicle may be controlled such that a constant speed of the vehicle is maintained. In an adaptive cruise control function, the speed of the vehicle may be automatically adapted depending on a further parameter, for example, a distance of a further vehicle in front of the ego-vehicle. However, the signal for enabling cruise control may be only an indication that cruise control might be activated upon further conditions, in particular conditions controlled by the apparatus 1 for controlling cruise control. Hence, cruise control might be still deactivated even though a signaling for enabling cruise control is received by receiving device 10.

Additionally, receiving device 10 may receive further signals, for example a signaling from an acceleration pedal or a brake pedal.

The signaling received by receiving device 10 may be provided to Controller 20. Controller 20 monitors the speed of the vehicle and/or the distance between the vehicle and a further vehicle in front of the vehicle based on the speed signal V received by receiving device 10. If the speed and/or the distance of the vehicle is within a predetermined range, and this value maintains within this predetermined range for a specified first period of time, this may be an indication for an appropriate situation to activate the cruise control. Accordingly, if cruise control is enabled by providing an appropriate enable signaling to receiving device 10, and the condition that the speed of the vehicle and/or the distance between the vehicle and a further vehicle in front of the vehicle is within the predetermined range for the specified first period of time, controller 20 may activate cruise control. For this purpose, an appropriate activation signaling may be provided to a cruise control device 100. Furthermore, controller 20 may provide a signaling to the user to indicate that an automated activation of cruise control is determined.

In this way, cruise control is automatically activated without a further interaction of the user.

After activating cruise control, cruise control device 100 may control the speed of the vehicle without further activities of the user. In particular, the user no longer has to operate the acceleration pedal.

Furthermore, it may be possible that the automatic activation of cruise control is only performed after a further confirmation of a user. For this purpose, controller 20 may provide a signaling upon detecting that the speed of the vehicle is within a predetermined range for the first period of time. However, cruise control is only activated, if a further acknowledgement of the user is received after outputting the signaling. For example, the further acknowledgement of the user may be a further user activity. In particular, the further user activity may be a release of the acceleration pedal. Accordingly, the user can acknowledge the automatic activation of the cruise control by removing his foot from the acceleration pedal. Accordingly, the speed of the vehicle is controlled by the cruise control system 100 upon the user releases the acceleration pedal. However, it may be also possible to acknowledge the activation of the cruise control by any other kind of user activity.

The signaling for indicating an automated activation of the cruise control may be provided as an optic, acoustic or haptic signaling. For example, the signaling may be provided by a signaling device 30. In particular, an optic signaling may be provided by a lamp or any other optic indication, for example an optic indication on an instrument panel. An acoustic signaling may be provided by outputting a predetermined sound, in particular a sound sequence. For example, an activation of cruise control may be indicated by a sound sequence having an increasing frequency. Furthermore, it may be also possible to provide a haptic signaling, for example by vibrating a steering wheel or an acceleration pedal.

Figure 2:
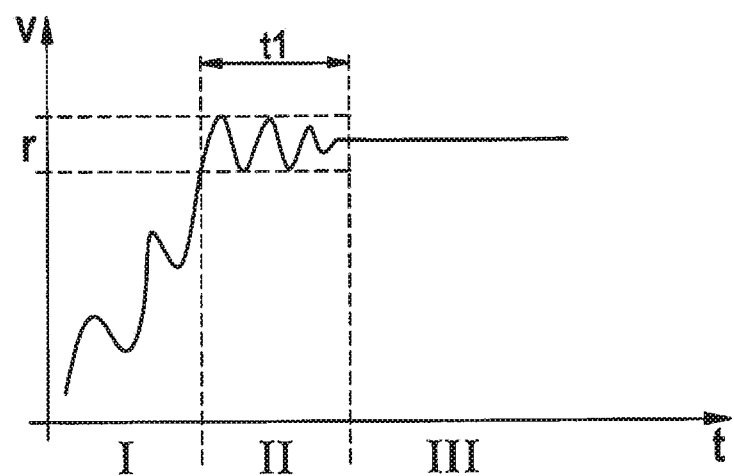
FIG. 2 shows a diagram illustrating a transition when activating cruise control according to an embodiment.

FIG. 2 shows a diagram illustrating the speed v of the vehicle over the time t for a transition to cruise control according to an embodiment. In a first sequence I, the vehicle is manually driven by the user. In a second sequence II, the speed of the vehicle is within a predetermined range r. Upon the speed of the vehicle maintains within the predetermined range for the above-mentioned first period of time t1, cruise control is automatically activated. Thus, in section III, the speed of the vehicle is controlled by the cruise control and the speed is kept constant or adapted depending of a preceding vehicle.

The predetermined range of the speed may be a fixed, predetermined range of speed. For example, a user may preset a desired speed, and the range of speed is computed to a range having a specific deviation from this preset, fixed speed. For example, a user may set a desired speed to 50 km/h, and the range of speed may be set a range of ±3 km/h, i.e. 47-53 km/h. However, it may be also possible that the upper and the lower limit may be different with respect to the desired speed.

Furthermore, it may be also possible to dynamically adapt the range of speed. For example, a range of speed may be set depending on a current speed of the vehicle. For example, a current speed of the vehicle may be used as a basis, and the range of the speed may be set to predetermined limits with respect to this current speed. The upper and lower limit of the range of speed may be set based on fixed values with respect to the current speed. For example, a range of the speed may be set to the current speed±3 km/h, 5 km/h or 10 km/h. However, it may be also possible to dynamically adapt the values for specifying the range of the speed depending on the current speed. For example, the range of speed may be set to the current speed±2%, 3%, 5% or 10%. However, any other scheme for determining the range of speed may be also possible.

Furthermore, the first period of time t1 may be set to a fixed value, for example 5 seconds, 10 seconds, 30 seconds, 60 seconds or the like. Alternatively, it may be also possible to adapt the first period of time t1 depending on further parameters. For example, the first period of time may be adapted depending on the current speed of the vehicle. For example, a function, in particular a linear function may be defined for determining the first period of time depending on the current speed. Alternatively, it may be also possible to predefine a number of two or more periods of time depending on the speed of the vehicle in a lookup table or the like. However, any other scheme for determining the first period of time depending on the speed of the vehicle may be also possible.

Furthermore, it may be also possible to set the first period of time depending on further parameters, for example external parameters such as a road condition, or internal parameters of the vehicle such as a steering wheel angle, parameter of a transmission lever or selector, a driving indicator or the like.

Figure 3:
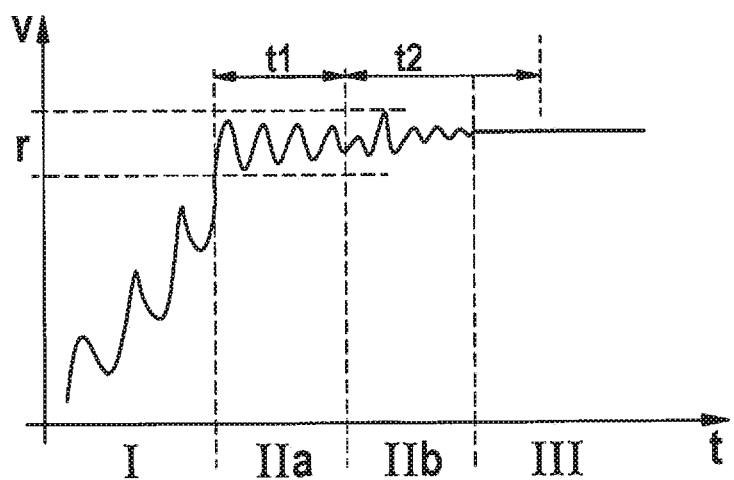
FIG. 3 shows a diagram illustrating a further transition to automated activation of cruise control according to an embodiment.

FIG. 3 shows a further diagram of the speed over the time illustrating a transition to activated cruise control. In section I, the speed of the vehicle is manually controlled by a user. In section IIa, the speed of the vehicle remains within a predetermined range r. Accordingly, after the speed of the vehicle maintains within the predetermined range r for the predetermined first period of time t1, a signaling is output.

However, the speed of the vehicle still is controlled manually by a user in section IIb. At the end of section IIb, a specific user activity is detected, and upon detecting the user activity, cruise control is activated in section III. The user activity may be, as already described above, a release of an acceleration pedal or the like. Hence, the user still may decide whether or not to accept the suggestion for automatic activation of cruise control. If the user does not respond with the desired user activity, the speed of the vehicle is still controlled manually by the user.

The time period in which a user may apply the predetermined user activity for activating cruise control may be limited to a predetermined second period of time t2. Accordingly, only if the user performs the predetermined user activity within the second period of time t2 after providing the signaling, an automated activation of cruise control is performed. Otherwise, if the user does not provide the specific user activity within the second period of time t2 after providing the signaling, the cruise control is not activated. Furthermore, the signaling may be also cancelled, if the user does not provide the desired user activity within the second period of time t2. Hence, no further disturbance is provided to the user if the user does not accept the suggestion for activating cruise control.

Figure 4:
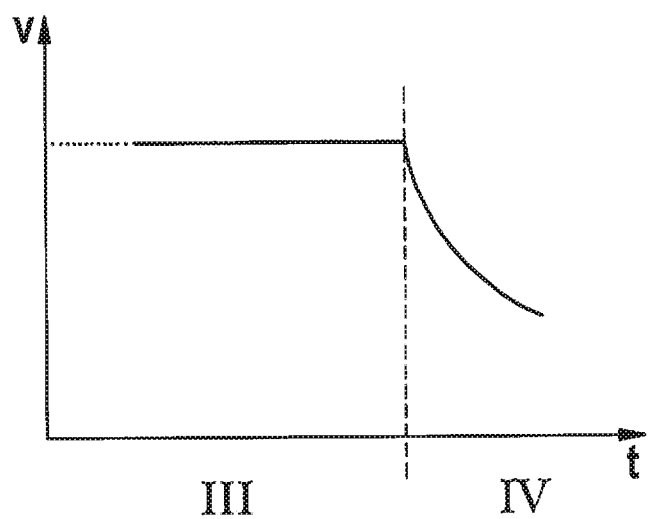
FIG. 4 shows a transition for stopping cruise control according to an embodiment.

FIG. 4 shows a further diagram of the speed of a vehicle over the time. In section III, cruise control is performed. Upon receiving a specific further user activity, for example an activity of a brake pedal or the acceleration pedal, cruise control is deactivated in section IV. After deactivating cruise control, the system may return to the beginning and start monitoring the speed of the vehicle in order to determine a speed of the vehicle within a predetermined range for the first period of time.

Figure 5:
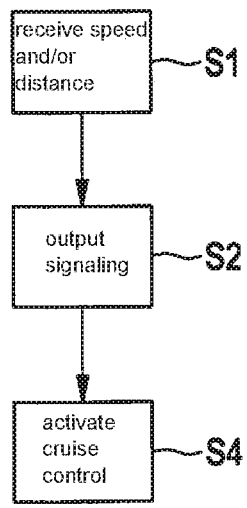
FIG. 5 shows a flowchart illustrating a method for controlling cruise control according to an embodiment.

FIG. 5 shows a flow diagram illustrating a method for controlling cruise control according to an example embodiment.

In step S1, a speed of the vehicle and/or a distance between the vehicle and a further vehicle in front of the vehicle is received and monitored.

In a step S2, a signaling is output upon detecting that the speed of the vehicle and/or a distance between the vehicle and a further vehicle in front of the vehicle is within a predetermined range for a first period of time.

In step S4, cruise control of the vehicle may be activated. In particular, cruise control of the vehicle may be activated, if the speed of the vehicle and/or the distance between the vehicle and a further vehicle in front of the vehicle is within a predetermined range for the first period of time and consequently, the signaling is output.

Figure 6:
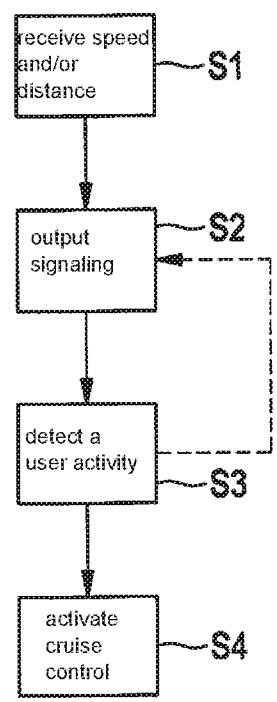
FIG. 6 shows a flowchart illustrating a method for controlling cruise control according to another embodiment.

FIG. 6 shows a flow diagram illustrating a further method for controlling cruise control according to an embodiment. The method mainly corresponds to the previously described method according to FIG. 5. The method according to FIG. 6 differs from the method according to FIG. 5 in that the method in FIG. 6 further comprises a step S3, for detecting a user activity. The user activity may be, for example, a release of an acceleration pedal.

Thus, the activation of cruise control in step S4 is only executed after detecting the further user activity.

Furthermore, the methods according to FIGS. 5 and 6 may also include any features as described above in conjunction with the control apparatus 1.

Summarizing, the present invention relates to an improved control of cruise control for a vehicle, in particular an automated activation of cruise control. For this purpose, the speed of the vehicle is monitored. If the speed of the vehicle is within a predetermined range for a specific period of time it is indicated to a user that cruise control can be activated. Accordingly, cruise control can be automatically activated after providing the indication to the user, or a user may respond to this indication by providing a specific activity such as a release of the acceleration pedal.

What is claimed is:

1. A method for controlling a cruise control of a vehicle, the method comprising the following steps:
    based on satisfaction of a condition that a range of a speed of the vehicle and/or of a distance between the vehicle and a further vehicle in front of the vehicle is a predetermined range for a predefined first period of time, starting a process for activating cruise control of the vehicle, wherein at least one of the following three features (1)-(3):
        (1) a size of the predetermined range varies depending on the speed of the vehicle that is a center of the range of the speed of the vehicle over the first period of time;
        (2) the first period of time varies depending on at least one of:
            (i) a steering wheel angle;
            (ii) the speed of the vehicle;
            (iii) a predefined condition of a road on which the vehicle is traveling; and
            (iv) a history of a user response to prior starts of the process for activating the cruise control; and
        (3) the starting of the process for activating the cruise control includes outputting a signal indicating that the condition has been satisfied, the activation of the cruise control is performed responsive to receiving user input of a confirmation to proceed with the activation of the cruise control within a second period of time from the outputting of the signal, and the method further comprises, due to failure to receive the user input of the confirmation within the second period of time, monitoring whether the condition is satisfied again in response to receiving a subsequent user input instruction to resume the monitoring.

2. The method according to claim 1, further comprising the following step:
    detecting a predefined user activity after the signaling has been output;
    wherein the cruise control of the vehicle is activated after the predefined user activity is detected.

3. The method according to claim 2, wherein the predefined user activity includes a release of an accelerator pedal.

4. The method according to claim 2, wherein the cruise control of the vehicle is activated only when the speed of the vehicle is within the predetermined range when detecting the predefined user activity.

5. The method according to claim 1, wherein the activation of the cruise control is performed responsive to receiving the user input of the confirmation within the second period of time from the outputting of the signal, the user input of the confirmation being a predefined user activity.

6. The method according to claim 1, wherein the starting of the process for activating the cruise control includes the outputting of the signal indicating that the condition has been satisfied, the signal being an optic signal, and/or an acoustic signal, and/or a haptic signal.

7. The method according to claim 1, further comprising the following step:
    deactivating the cruise control of the vehicle upon detecting a further user activity.

8. The method according to claim 7, wherein the further user activity includes an operation of a brake pedal or an operation of an accelerator pedal.

9. The method according to claim 1, wherein the first period of time is dynamically adapted depending on a user input.

10. The method according to claim 1, wherein the size of the predetermined range varies depending on the speed of the vehicle that is the center of the range of the speed of the vehicle over the first period of time.

11. The method according to claim 1, wherein the first period of time varies depending on the steering wheel angle.

12. The method according to claim 1, wherein the first period of time varies depending on the speed of the vehicle.

13. The method according to claim 1, wherein the first period of time varies depending on the predefined condition of the road on which the vehicle is traveling.

14. The method according to claim 13, wherein the predefined condition of the road is a curviness of the road.

15. The method according to claim 14, wherein the first period of time is lengthened for an increased curviness of the road.

16. The method according to claim 1, wherein the first period of time varies depending on the history of the user response to prior starts of the process for activating the cruise control.

17. The method according to claim 16, wherein the first period of time is increased in response to a predetermined number of successive starts of the process for activating the cruise control being implemented based on the satisfaction of the condition without the user responding with the user input of the confirmation.

18. The method according to claim 1, wherein the starting of the process for activating the cruise control includes the outputting of the signal indicating that the condition has been satisfied, the activation of the cruise control is performed responsive to receiving the user input of the confirmation to proceed with the activation of the cruise control within the second period of time from the outputting of the signal, and the method further comprises, due to the failure to receive the user input of the confirmation within the second period of time, the monitoring of whether the condition is satisfied again in response to receiving the subsequent user input instruction to resume the monitoring.

19. The method according to claim 1, wherein the starting of the process for activating the cruise control includes the outputting of the signal, and the method further includes activating the cruise control after the signal has been output.

20. An apparatus for controlling a cruise control of a vehicle, the apparatus comprising a processor, wherein the processor is configured to perform a method, the method comprising:
based on satisfaction of a condition that a range of a speed of the vehicle and/or of a distance between the vehicle and a further vehicle in front of the vehicle is a predetermined range for a predefined first period of time, starting a process for activating cruise control of the vehicle, wherein at least one of the following three features (1)-(3):
(1) a size of the predetermined range varies depending on the speed of the vehicle that is a center of the range of the speed of the vehicle over the first period of time;
(2) the first period of time varies depending on at least one of:
(i) a steering wheel angle;
(ii) the speed of the vehicle;
(iii) a predefined condition of a road on which the vehicle is traveling; and
(iv) a history of a user response to prior starts of the process for activating the cruise control; and
(3) the starting of the process for activating the cruise control includes outputting a signal indicating that the condition has been satisfied, the activation of the cruise control is performed responsive to receiving user input of a confirmation to proceed with the activation of the cruise control within a second period of time from the outputting of the signal, and the method further comprises, due to failure to receive the user input of the confirmation within the second period of time, monitoring whether the condition is satisfied again in response to receiving a subsequent user input instruction to resume the monitoring.

* * * * *